United States Patent
Shinojima et al.

(10) Patent No.: US 9,188,207 B2
(45) Date of Patent: Nov. 17, 2015

(54) CONTINUOUSLY VARIABLE TRANSMISSION DEVICE

(75) Inventors: Takumi Shinojima, Kanagawa (JP); Hiromasa Nakamura, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 18 days.

(21) Appl. No.: 13/977,959

(22) PCT Filed: Jan. 12, 2012

(86) PCT No.: PCT/JP2012/050476
§ 371 (c)(1),
(2), (4) Date: Aug. 7, 2013

(87) PCT Pub. No.: WO2012/096341
PCT Pub. Date: Jul. 19, 2012

(65) Prior Publication Data
US 2013/0310208 A1    Nov. 21, 2013

(30) Foreign Application Priority Data

Jan. 14, 2011  (JP) .................. 2011-005622

(51) Int. Cl.
*F16H 15/38* (2006.01)
*F16H 3/44* (2006.01)
(Continued)

(52) U.S. Cl.
CPC ............ *F16H 15/40* (2013.01); *F16H 61/6648* (2013.01); *F16H 2059/746* (2013.01); *F16H 2061/0056* (2013.01); *F16H 2061/0087* (2013.01)

(58) Field of Classification Search
CPC ............ F16H 15/40; F16H 2061/0056; F16H 2059/746
USPC .......................................................... 701/59
See application file for complete search history.

(56) References Cited

U.S. PATENT DOCUMENTS 8,926,472 B2 *   1/2015  Shinojima et al. .............. 477/39
2004/0204284 A1  10/2004  Inoue et al.
(Continued)

FOREIGN PATENT DOCUMENTS

DE   102004017505 A   12/2004
JP       11230324 A    8/1999
(Continued)

OTHER PUBLICATIONS

"Toroidal CVT", Hirohisa Tanaka, Corona Publishing Co., Ltd. (Jul. 13, 2000) with partial English translation.
(Continued)

*Primary Examiner* — Justin Holmes
*Assistant Examiner* — Lillian Nguyen
(74) *Attorney, Agent, or Firm* — Katten Muchin Rosenman LLP (57) ABSTRACT

Construction is achieved that is capable of ensuring reliability of a learned value for a step position of a stepping motor 24 which becomes the criterion for the transmission gear ratio control of a toroidal continuously variable transmission 4 without losing opportunities for learning more than necessary even when the ignition switch is turned OFF during learning of the step position. The controller 11 determines the ON/OFF state of the ignition switch 33, and when it is determined that the ignition switch 33 is in the OFF state, the controller 11 prevents learning control from being executed. The state in which the rpm of the engine 1 is dropping from after the ignition switch 33 is turned OFF is eliminated from being an object of learning control for learning the step position, such that erroneous learning is prevented, while the state in which the rpm of the engine 1 becomes stable after the ignition switch 33 is turned ON is not eliminated.

2 Claims, 4 Drawing Sheets (51) Int. Cl.
*F16H 37/02* (2006.01)
*F16H 15/40* (2006.01)
*F16H 61/664* (2006.01)
*F16H 59/74* (2006.01)
*F16H 61/00* (2006.01)

(56) References Cited

U.S. PATENT DOCUMENTS

2005/0037887 A1* 2/2005 Shinojima et al. ............ 475/214
2010/0331142 A1* 12/2010 Mizoguchi et al. ............ 477/111
2013/0311056 A1* 11/2013 Shinojima et al. .............. 701/58

FOREIGN PATENT DOCUMENTS

| JP | 2001317601 | 11/2001 |
| JP | 2003307266 | 10/2003 |
| JP | 2004308853 A | 11/2004 |
| JP | 2005233377 A | 9/2005 |

OTHER PUBLICATIONS

International Search Report and Written Opinion dated Mar. 27, 2012 from the corresponding PCT/JP2012/050476.

* cited by examiner

CONTINUOUSLY VARIABLE TRANSMISSION DEVICE

TECHNICAL FIELD

The present invention relates to the improvement of a continuously variable transmission device in which a toroidal continuously variable transmission is assembled and that is used as an automatic transmission device of an automobile, an automatic transmission device of construction equipment, an automatic transmission device for an electric generator that is used in aircraft and the like.

BACKGROUND ART

Toroidal continuously variable transmissions that are used as automatic transmissions for automobiles are disclosed in many publications such as JP 2001-317601 (A) and "Toroidal CVT", Hirohisa Tanaka, Corona Publishing Co., Ltd. (Jul. 13, 2000), and such transmissions are well known and are partially being put into use. This kind of toroidal continuously variable transmission includes an input-side disk and an output-side disk that are such that the side surfaces in the axial direction thereof that face each other are toroid shaped curved surfaces, and a plurality of power rollers that is held between these disks. During operation, the rotation of the input-side disk is transmitted to the output-side disk by way of the power rollers. These power rollers are supported by support members such as trunnions so as to be able to rotate freely, and these support members are supported so as to be able to freely pivot and displace around pivot shafts that are located offset from the center axis of the input-side and output-side disks such that the pivot shafts and the center axis do not lie in the same plane. When changing the transmission gear ratio between the input-side and output-side disks, a hydraulic actuator causes the support members to displace in the axial direction of the pivot shafts. Supply and discharge of hydraulic oil to and from this actuator is controlled by a control valve, however, at the same time, the movement of the support members is fed back to the control valve.

When the support members are caused to displace in the axial direction of the pivot shafts based on the supply and discharge of hydraulic oil to and from the actuator, the direction of the force in the tangential direction that acts at the areas of contact (traction sections) between the circumferential surfaces of the power rollers and the side surfaces of the input-side and output-side disks changes, and side slipping occurs in the areas of rolling contact. As the direction of this force changes, each of the support members pivots (inclines) around the respective pivot shaft, and the locations of contact between the circumferential surfaces of the power rollers and the side surfaces of the input-side and output-side disks change. When the circumferential surfaces of these power rollers come in rolling contact with the portion of the input-side disk that is near the outside in the radial direction and the portion of the output-side disk that is near the inside in the radial direction, the transmission gear ratio between the input-side and output-side disks is on the accelerating side. On the other hand, when the circumferential surfaces of these power rollers come in rolling contact with the portion of the input-side disk that is near the inside in the radial direction and the portion of the output-side disk that is near the outside in the radial direction, the transmission gear ratio between the input-side and output-side disks is on the decelerating side.

When this kind of toroidal continuously variable transmission device is assembled in an automatic transmission of an automobile, construction in which the continuously variable transmission is combined with a differential gear unit such as a planetary gear mechanism has been proposed. JP 2003-307266 (A) discloses a continuously variable transmission device in which the input shaft is rotated in one direction, and the rotating state of the output shaft is switched between a forward rotating state and a reverse rotating state with the stopped state (so-called gear-neutral state) in between. In the case of this kind of continuously variable transmission device, in the so-called low-speed mode state, the transmission gear ratio of the overall continuously variable transmission device changes to become infinitely large. In other words, by adjusting the transmission gear ratio of the toroidal continuously variable transmission, while the input shaft remains in a state of rotating in a single direction, the rotating state of the output shaft can be changed between a forward rotating state and reverse rotating state with a stopped state in between. In the case of a continuously variable transmission device that is capable of achieving an infinitely large transmission gear ratio, the transmission gear ratio of a toroidal continuously variable transmission is such that near a value where it is possible to achieve a stopped state of the output shaft (geared neutral point, GN point), the state of the power that is transmitted to the output shaft greatly changes even when this transmission gear ratio is changed only a little. Therefore, control of the transmission gear ratio of a toroidal continuously variable transmission must be performed with high precision.

For example, when the automobile is in the stopped state and the shift lever is moved from a non-moving state such as the P range (parking position) or N range (neutral position) to a moving state such as the D range (normal forward position), L range (high drive forward position) or R range (reverse position), a suitable driving force in the forward or reverse direction is quickly generated and it is necessary to keep the vehicle in the stopped state by a braking force caused by operating the brake pedal. Therefore, in a state in which the shift lever has selected a non-moving state, the transmission gear ratio of a toroidal continuously variable transmission must be strictly controlled at a value at which it is possible to achieve a state of an infinitely large transmission gear ratio. Supposing that the transmission gear ratio of a toroidal continuously variable transmission shifts a large amount from a value at which it is possible to achieve an infinitely large transmission gear ratio, and the shift lever has selected a moving state, there is a possibility that a driving force that is greater than anticipated (creep force) will be transmitted and the vehicle will begin to move, or that a driving force in a direction opposite that intended by the operator will be transmitted.

On the other hand, there is a large number of parts assembled in a toroidal continuously variable transmission, and the dimensional precision and assembly precision of many of those parts have an effect on the transmission gear ratio of the toroidal continuously variable transmission. Therefore, it is feasible that individual differences will occur in the transmission gear ratio of toroidal continuously variable transmissions that are capable of achieving a state of an infinitely large transmission gear ratio that is found through design calculation. Moreover, it is also feasible that the characteristics of a transmission gear ratio of a toroidal continuously variable transmission that is capable of a state of an infinitely large transmission gear ratio will change due to changes over time of the components that are used for long periods of time (slight plastic deformation).

On the other hand, JP 2004-308853 (A) discloses giving a learning function to a controller for learning the step position of a stepping motor, in which with the shift lever selecting a non-moving state as a condition, the output shaft is stopped with the input shaft rotating as is. More specifically, with the shift lever selecting a non-moving state as a condition, the rpm of the input-side disk and the rpm of the output-side disk of a toroidal continuously variable transmission are detected by respective rotation sensors. The controller finds the rotational speed of the output shaft in a non-moving state based on the actual transmission gear ratio that is obtained from the rotational speeds of the input-side disk and output-side disk (rotational speed of the input-side disk/rotational speed of the output side disk), and the transmission gear ratio of a planetary gear transmission. The controller then adjusts the transmission gear ratio of the toroidal continuously variable transmission by adjusting the step position (driving amount) of the stepping motor so that the rotational speed of the output shaft is "0". The controller learns the step position for the state where the rotational speed of the output shaft is "0", then stores that step position in the controller memory to complete learning control. The controller controls the transmission gear ratio of the toroidal continuously variable transmission with the adjusted step position (learned value) as a reference. As a result, it becomes possible to control the transmission gear ratio with high precision without being affected by individual differences in or changes over time of the components of the toroidal continuously variable transmission.

However, in the case of the control method related to learning the step position that was conventionally considered, there is a possibility that when the driver turns OFF the ignition switch (ignition key) during learning of the step position, the controller will no longer be able to accurately learn the step position. In other words, when the user turns OFF the ignition switch in order to stop the engine from running (operating), the engine rotational speed drops over a certain period of time, although it is a short period of time. The speed of this drop is fast, so in this state, there is a possibility that the drop in the rotational speed of the input-side and output-side disks will not be synchronized with each other. Therefore, there is a possibility that the transmission gear ratio of a toroidal continuously variable transmission, which is calculated from the rotational speeds of the input-side and output-side disks, will be off from the value of the actual transmission gear ratio. When learning of the step position continues in a state such as this in which it is not possible to accurately calculate the transmission gear ratio of the toroidal continuously variable transmission, a problem occurs in that the obtained learned value is off from a suitable position for stopping the output shaft, and the step position will be incorrectly learned.

Moreover, when the rotation of the engine (crankshaft) is transmitted as is to the input-side disk, it is feasible, as a way to reduce costs, to omit the input-side rotation sensor for detecting the rotational speed of the input-side disk, and calculate the transmission gear ratio of the toroidal continuously variable transmission using a signal from an engine controller that expresses the engine rotational speed. However, in this case, it is also possible that at the same time that the driver turns OFF the ignition switch, the signal that expresses the engine rotational speed will no longer be obtainable, so it will become difficult to accurately calculate the transmission gear ratio of the toroidal continuously variable transmission. Therefore, there is a possibility that the obtained learned value will be off from a suitable position for stopping the output shaft.

When the ignition switch is turned OFF in this way during learning of the step position, there is a possibility that the transmission gear ratio of the toroidal continuously variable transmission will not be able to be calculated accurately regardless of the calculation method used for calculating the transmission gear ratio of the toroidal continuously variable transmission. As a result, there is a possibility that transmission gear ratio control will start in a state in which the step position of the stepping motor is off from the accurate position for stopping the output shaft, so not only is there a possibility that the feeling when shifting will be impaired, but in the worst case, there is also a possibility that the vehicle will move in a direction opposite the position selected by the shift lever.

On the other hand, learning of the step position can only be executed when the engine is running, so, it is possible to simply add the condition that the engine rotational speed is not "0" (zero), or the condition that the engine rotational speed is higher than a specified rotational speed to conditions for allowing learning of the step position. However, in this case as well, even though there is a possibility that the occurrence frequency of the problem described above can be reduced, learning of the step position is executed while the engine rotational speed goes from the idling speed (for example 800 rpm) to "0", or while the engine rotational speed drops from the idling speed to a specified rotational speed or less (for example, when the specified rotational speed is set to 500 rpm, range D in FIG. 4), so basically the problem described above cannot be solved.

Furthermore, by setting the specified rotational speed to a value close to about 90% of the idling speed, it is feasible that the time that the conditions for allowing learning of the step position may be satisfied while the engine rotational speed drops after the ignition switch is turned OFF will be reduced, and that the learning time leading to erroneous learning will be shortened. In this case, it is possible to reduce the occurrence frequency of the problem described above, however, the idling speed fluctuates depending on the temperature of the engine coolant and the like, so there is a possibility that the conditions for allowing learning will not be satisfied even though the ignition switch is ON and the engine rotational speed has not dropped and is within the original range of being an object of learning control, and thus there is a possibility that a new problem will occur in which opportunities for learning are lost more than necessary, and that the frequency that learning control is performed will be reduced more than necessary.

RELATED LITERATURE

Patent Literature

[Patent Literature 1] JP 2001-317601 (A)
[Patent Literature 2] JP 2003-307266 (A)
[Patent Literature 3] JP 2004-308853 (A)

Non-Patent Literature

[Non-patent Literature 1] "Toroidal CVT", Hirohisa Tanaka, Corona Publishing Co., Ltd. (Jul. 13, 2000)

SUMMARY OF THE INVENTION

Problem to be Solved by the Invention

In consideration of the situation described above, it is the object of the present invention to achieve construction of a continuously variable transmission device in which a toroidal continuously variable transmission is assembled that is capable of ensuring reliability of a learned value for a position of an adjustment member which becomes the criterion for the control of the transmission gear ratio of the toroidal continuously variable transmission device without losing opportunities for learning more than necessary even when the ignition switch is turned OFF during learning of the position of the adjustment member.

Means for Solving the Problems

The continuously variable transmission of the present invention has: an input shaft, an output shaft, a toroidal continuously variable transmission, a differential gear unit and a controller. The input shaft is a shaft to which engine output is inputted. The power that is transmitted to the input shaft is transmitted to the output shaft by way of the toroidal continuously variable transmission and the differential gear unit.

The toroidal continuously variable transmission, has: an input-side disk that is rotated and driven by the input shaft; an output-side disk that is concentric with the input-side disk and that is supported so as to be able to rotate freely with respect to the input-side disk; a plurality of power rollers that is held between the input-side disk and the output-side disk; a plurality of support members that supports the power rollers so as to be able to roll freely; an actuator that changes the transmission gear ratio between the input-side disk and the output-side disk by causing the support members to displace; a control unit that has an adjustment member that controls the direction and amount of displacement of the actuator in order to adjust the transmission gear ratio to a desired value; an input-side rotation sensor for detecting the rotational speed of the input-side disk, and an output-side rotation sensor for detecting the rotational speed of the output-side disk.

The differential gear unit has a first input section that has a plurality of gears and that is rotated and driven by the input shaft along with the input-side disk; and a second input section that is connected to the output-side disk; and takes the rotation according to the speed difference between the first and second input sections, and transmits that rotation to the output shaft.

The controller is for controlling the change in the transmission gear ratio of the toroidal continuously variable transmission, and includes an engine control unit (ECU) and the like; and has:
  a first function that, by adjusting the transmission gear ratio of the toroidal continuously variable transmission and changing the relative displacement speed of the plurality of gears, converts the rotational state of the output shaft to forward rotation or reverse rotation with the stopped state in between while the input shaft is being rotated as is in one direction;
  a second function of calculating the transmission gear ratio of the toroidal continuously variable transmission from the rotational speed of the input-side disk that is found from the input-side rotation sensor, and the rotational speed of the output-side disk that is found from the output-side rotation sensor; and
  a third function of performing learning control that, with satisfying specified conditions for allowing learning as a condition, adjusts the transmission gear ratio of the toroidal continuously variable transmission to a state where the rotational speed of the output shaft becomes "0", and then learns and stores the position of the adjustment member in this state as the position where the output shaft is stopped while the input shaft is rotating as is.

Particularly, in the continuously variable transmission device of the present invention, as the conditions for allowing learning for executing the learning control by the third function, a state in which the ignition switch for starting and stopping the engine is ON is included. In other words, in the state in which the ignition switch is OFF, the execution of learning control is prohibited.

Preferably, the engine rotational speed being a higher value than a set lower-limit rotational speed, which was set to a value lower than a target idling speed that is set by the controller, is included in the conditions for allowing learning for executing learning control by the third function.

Effect of the Invention

With the present invention, it is possible to ensure the reliability of a learned value without losing opportunities for learning more than necessary even when the ignition switch is turned OFF during learning of a position of an adjustment member that becomes the criterion for controlling the transmission gear ratio of the toroidal continuously variable transmission.

In other words, in a state in which the engine rotational speed is dropping from immediately after the ignition switch is turned OFF until the engine rotational speed becomes "0" (a state in which the engine rotational speed is unstable, and there is also insufficient synchronization stability between the input-side disk and output-side disk), execution of learning a position of the adjustment member is prevented. Therefore, it is possible to effectively prevent the obtained learned value from becoming unsuitable for stopping the output shaft. Moreover, performing learning is prevented with the ignition switch being turned OFF which causes the engine rotational speed to decrease, so a state in which the engine rotational speed is stable, such as during idling, is not eliminated from being an object of learning control. Therefore, with the present invention, it is possible to ensure the reliability of a learned value without losing opportunities for learning more than necessary.

Furthermore, by including the state in which the engine rotational speed is a higher value than a set lower-limit rotational speed, which was set to a value lower than a target idling speed that is set by the controller, in the conditions allowing learning for executing learning control by the third function, it is possible to effectively prevent learning of a position of the adjustment member from being executed in a state in which the engine rotational speed rises immediately after the ignition is turned ON (state in which the engine rotational speed is unstable). Even when the engine rotational speed is rising, there is a possibility that the amount of rise in the rotational speeds of the input-side disk and output-side disk will not match (the synchronization stability between the input-side and output-side disk become insufficient), however, it is possible to eliminate a state such as this in which there is a possibility of erroneous learning from being an object of learning control. Therefore, it is possible to further improve the reliability of a learned value of a position of the adjustment member.

MODES FOR CARRYING OUT THE INVENTION

FIG. 1 to FIG. 4 illustrate an example of an embodiment of the present invention. In the block diagram in FIG. 1, the thick arrows indicate the power transmission path, the solid lines indicate the hydraulic circuit, and the dashed lines indicate the electric circuit. The continuously variable transmission device of this example, as in a conventional device, basically includes an input shaft 3, an output shaft 14, a toroidal continuously variable transmission 4, a differential gear unit (planetary gear transmission) 12 and a controller 11 for controlling the transmission gear ratio of the toroidal continuously variable transmission 4.

Figure 1:
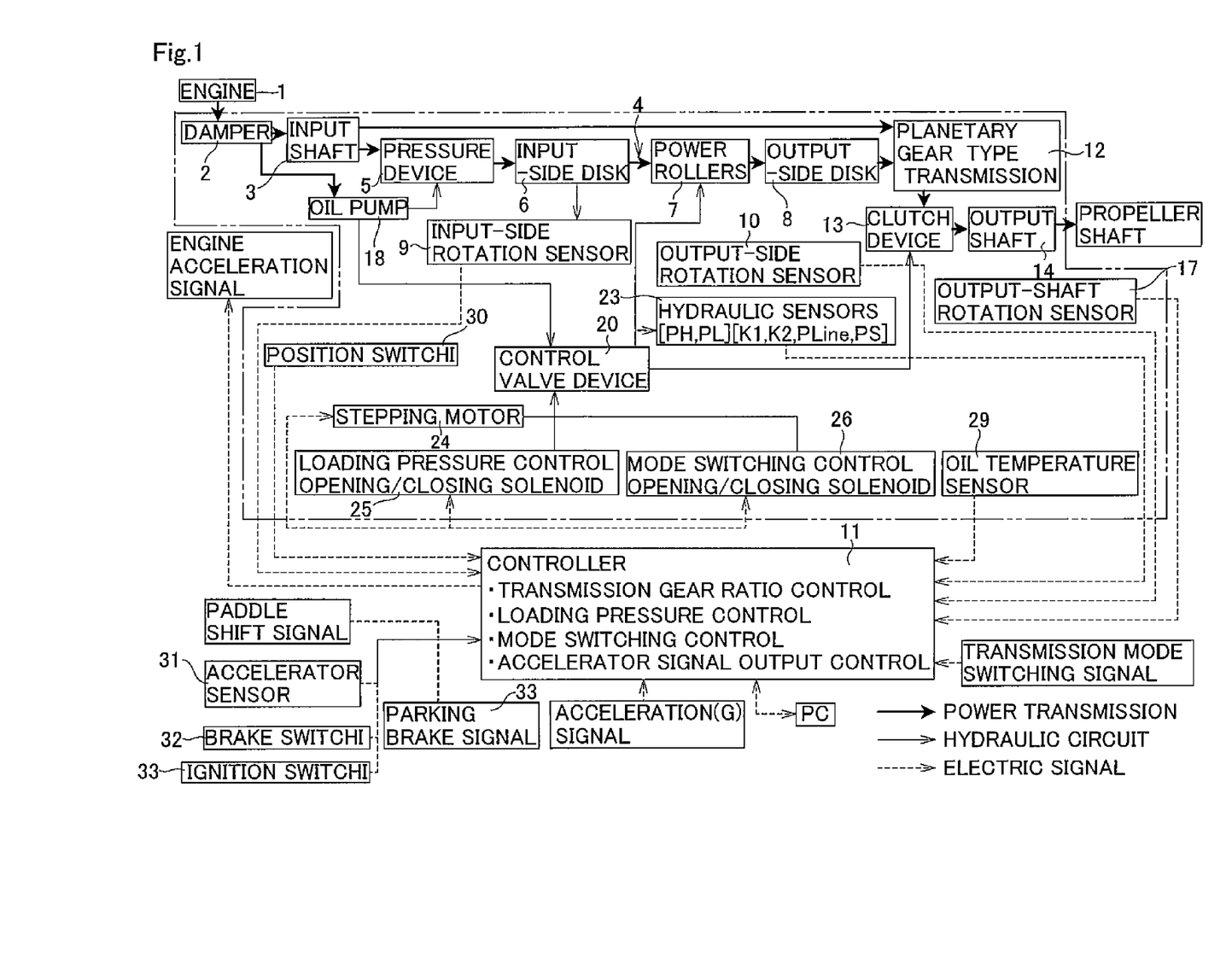
FIG. 1 is a block diagram illustrating a continuously variable device of an example of an embodiment of the present invention.

The toroidal continuously variable transmission 4 basically includes an input-side disk 6, an output-side disk 8, a plurality of power rollers 7, a plurality of support members such as trunnions (not illustrated in the figure), an actuator 19, a control unit (control valve device) 20, an input-side rotation sensor 9, and an output-side rotation sensor 10. As long as the support member is able to support each of the power rollers 7 so as to be able to roll freely, is able to pivotally displace around a pivot shaft that supports the support members, and is able to displace in the axial direction of this pivot shaft, other well known members such as a carriage can be used.

The input-side disk 6 is rotated and driven by the input shaft 3 together with a first input section of the planetary gear type transmission 12. More specifically, the output from the engine 1 is inputted to the input shaft 3 by way of a damper 2, and power that is transmitted to this input shaft 3 is transmitted to the input-side disk 6 from a hydraulic pressure device 5 of the toroidal continuously variable transmission 4. On the other hand, the output-side disk 8 is supported so as to be concentric with the input-side disk 6 and to be able to freely rotate relative to the input-side disk 6, and is connected to a second input section of the planetary gear type transmission 12. Moreover, each of the power rollers 7 is supported by a trunnion which corresponds to the support member so as to be able to roll freely, and is held between the input-side disk 6 and output-side disk 8. Therefore, power that is transmitted to the input-side disk 6 is transmitted to the output-side disk 8 by way of the power rollers 7. The rotational speed of the input-side disk 6 is measured by the input-side rotation sensor 9, and the rotational speed of the output-side disk 8 is measured by the output-side rotation sensor 10, and by inputting the results to the controller 11, the transmission gear ratio between the input-side disk 6 and the output-side disk 8 is calculated.

Furthermore, when the actuator 19 is a typical hydraulic actuator, the actuator 19 changes the transmission gear ratio between the input-side disk 6 and the output-side disk 8 by causing the trunnions (not illustrated in the figure) to displace in the axial direction of the pivot shafts (not illustrated in the figure) based on the supply state or discharge state of hydraulic oil. The control valve device 20, which is a control unit, controls the displacement direction and displacement amount of the actuator 19 in order that the transmission gear ratio between the input-side disk 6 and the output-side disk 8 becomes a desired value, and comprises an adjustment member (stepping motor 24), a loading pressure control opening/closing solenoid 25, a mode switching control opening/closing solenoid 26, and a control valve device (control valve 21) that switches the operating state according to these, and the like. The adjustment member means a member that is driven by a control signal from the controller 11, and changes (adjusts) the switched state of the control valve 21 of the control unit; where in this example, a stepping motor 24 is used as the adjustment member, however it is also possible to use a servo motor as the adjustment member.

The planetary gear transmission 12, which is a differential gear unit, is a combination of a plurality of gears, and includes a first input unit to which power that is transmitted to the input shaft 3 is directly transmitted by being rotated and driven by the input shaft 3, and a second input unit that is connected to the output-side disk 8 of the toroidal continuously variable transmission 4 and to which power that is transmitted to the input shaft 3 is transmitted by way of the toroidal continuously variable transmission 4. The differential component (rotation due to the speed difference between the first and second input sections) of the members of the planetary gear transmission 12 is output to the output shaft 14 by way of a clutch device 13. The differential unit of the present invention can be either a single pinion type or double pinion type, and one planetary gear type transmission can be used alone, or a combination of a plurality of planetary gear transmissions can be used. Moreover, in this example, an output shaft rotation sensor 17 detects the rotational speed of the output shaft 14, and enables a fail-safe for determining whether or not there is trouble in the input-side rotation sensor 9 and output-side rotation sensor 10.

Figure 2:
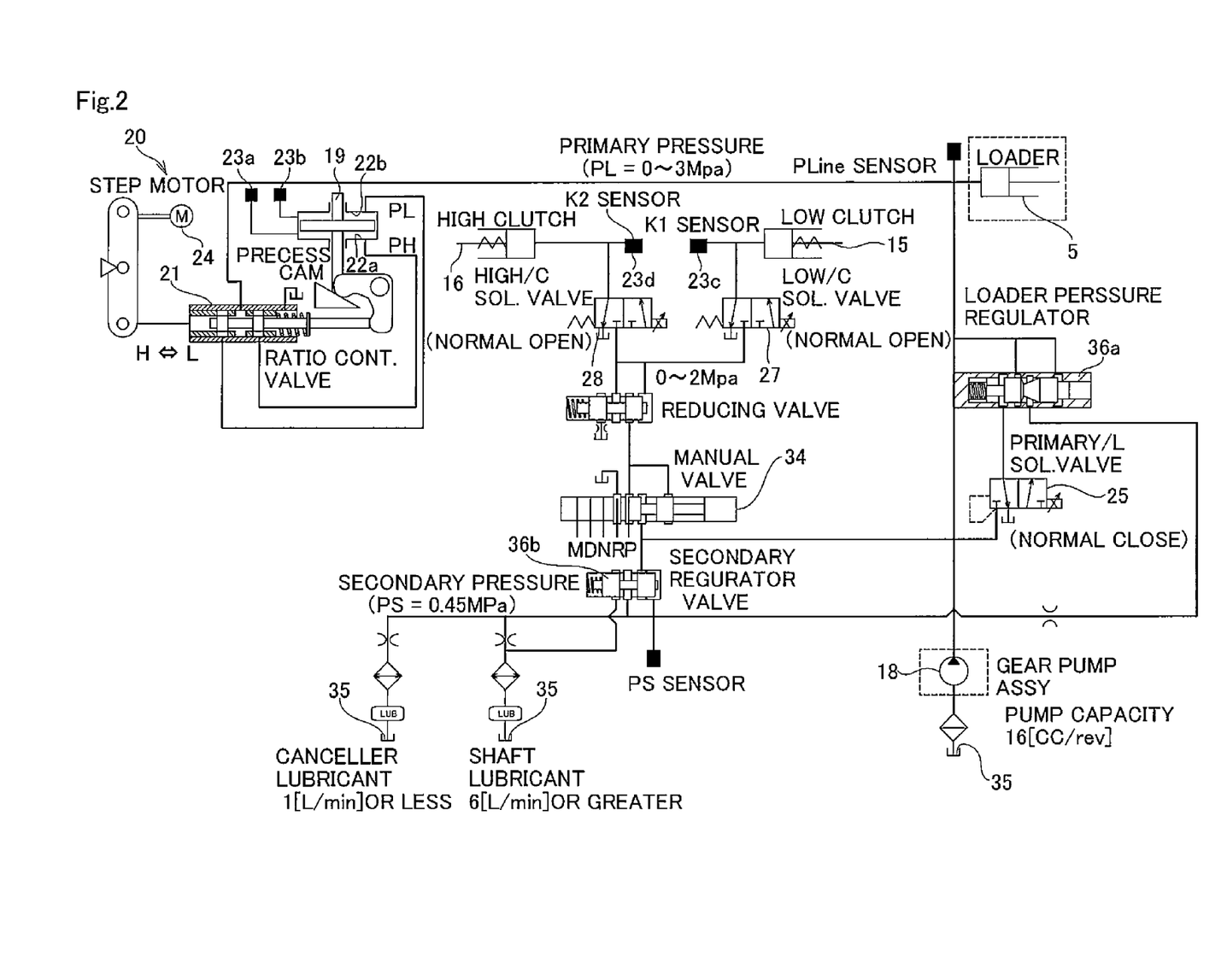
FIG. 2 is a hydraulic circuit diagram illustrating a mechanism for adjusting the transmission gear ratio of a toroidal continuously variable transmission that is assembled in the continuously variable transmission device of the example of an embodiment of the present invention shown in FIG. 1.

On the other hand, the power that is extracted from the damper 2 drives the oil pump 18, and the hydraulic oil that is discharged from this oil pump 18 is freely fed to the pressure device 5, and control valve device 20, which is a control unit for controlling the displacement amount of the actuator 19 (see FIG. 2). The control valve 21 of the control valve device 20 (see FIG. 2) controls the supply of hydraulic oil to and discharge of hydraulic oil from the actuator 19. The oil pressure in a pair of hydraulic oil chambers 22a, 22b (see FIG. 2) provided in the actuator 19 is detected by a hydraulic sensor 23 (in FIG. 2, this is illustrated as a pair of hydraulic sensors 23a, 23b), and detection signals from the hydraulic sensor 23 are inputted to the controller 11. The controller 11 calculates the torque (passing torque) that passes through the toroidal continuously variable transmission 4 based on the signals from the hydraulic sensor 23 (hydraulic sensors 23a, 23b).

More specifically, the operating state of the control valve device 20 is switched by the stepping motor 24, which is the driving member (adjustment member) of the control valve 21, the loading pressure control opening/closing solenoid 25, and mode switching opening/closing solenoid 26 (low-speed clutch solenoid 27 and high-speed clutch solenoid 28 in FIG. 2). The operating states of the stepping motor 24, loading pressure control opening/closing solenoid 25 and mode switching opening/closing solenoid 26 are switched based on control signals from the controller 11.

The controller 11 includes a microcomputer such as an engine control unit (ECU), and in addition to signals from the input-side rotation sensor 9, output-side rotation sensor 10, output-shaft rotation sensor 17 and hydraulic sensor 23, a detection signal from an oil temperature sensor 29, a position signal from a position switch 30, a detection signal from an accelerator sensor 31, a signal from a brake switch 32, a signal from an ignition switch 33 and the like are inputted to the controller 11. The oil temperature sensor 29 is a sensor for detecting the temperature of lubrication oil (traction oil) in a casing that houses the continuously variable device. The position switch 30 is a switch for switching the manual hydraulic switching valve 34 (see FIG. 2), and emits a signal that indicates the operating position (selected position) of the shift lever (operation lever) that is provided on the driver's side. The accelerator sensor 31 is a sensor for detecting the opening amount of the accelerator pedal. The brake switch 32 is a switch that detects that the brake pedal has been pressed, and emits a signal that indicates that. Furthermore, the ignition switch 33 is a switch for starting or stopping the engine 1, and detects the operating state (selection position) of the ignition key and emits a signal that expresses that (signal expressing the ON/OFF state).

The controller 11, based on signals from the switches and sensors above, transmits control signals to the stepping motor 24, loading pressure control opening/closing solenoid 25 and mode switching control opening/closing solenoid 26, and also transmits a control signal for controlling the engine 1. The controller 11 then controls the transmission gear ratio between the input shaft 3 and output shaft 4, or when stopped or traveling at low speed, controls the torque (passing torque) that passes through the toroidal continuously variable transmission 4 and is applied to the output shaft 14.

FIG. 2 illustrates the hydraulic circuit that controls this kind of continuously variable transmission. In this hydraulic circuit, hydraulic oil that is taken up from an oil reservoir 35 and discharged from an oil pump 18 can be adjusted to a specified pressure by regulator valves 36a, 36b. The adjusted pressure that was adjusted by the regulator valve 36a, which is one of the regulator valves 36a, 36b for adjusting the oil pressure of the oil to be fed to the manual hydraulic switching valve 34 side, can be adjusted based on opening/closing of the loading pressure control opening/closing solenoid 25. The hydraulic oil whose pressure was adjusted by the regulator valves 36a, 36b is fed to the actuator 19 by way of a control valve 21.

This hydraulic oil can be fed to inside a hydraulic chamber of a low-speed clutch 15 or high-speed clutch 16 of a clutch apparatus 13 by way of the manual hydraulic switching valve 34 and a low-speed clutch solenoid 27 or high-speed clutch solenoid 28. The low-speed clutch 15 is connected when a low-speed mode is achieved in which the speed reduction ratio is large (includes an infinitely large transmission gear ratio), and is disconnected when a high-speed mode is achieved that reduces the speed reduction ratio. On the other hand, the high-speed clutch 16 is disconnected when the low-speed mode is achieved, and is connected when the high-speed mode is achieved. Moreover, the supply/discharge state of hydraulic oil to the low-speed clutch 15 or high-speed clutch 16 is detected by the hydraulic sensors 23c, 23d, and detection signals are inputted to the controller 11.

This controller 11 basically has:

(1) a first function of adjusting the transmission gear ratio of the toroidal continuously variable transmission 4, and that, with the input shaft rotating as is in one direction, changes the rotating state of the output shaft to forward direction or reverse direction with a stopped state in between by changing the relative displacement speed between the plurality of gears of the planetary gear transmission 12, which is the differential unit;

(2) a second function of calculating the transmission gear ratio (rotational speed of the input-side disk 6/rotational speed of the output-side disk 8) of the toroidal continuously variable transmission 4 according to the rotational speed of the input-side disk 6 that is found from the input-side rotation sensor 9 and the rotational speed of the output-side disk 8 that is found from the output-side rotation sensor 10; and (3) a third function of performing learning control of learning and storing a position of the adjustment member of the control unit (for example step position of the stepping motor 24) when, with specified conditions for allowing learning satisfied, the transmission gear ratio of the toroidal continuously variable transmission 4 is adjusted to a state where the rotational speed of the output shaft 14 becomes "0" (zero).

Particularly in this example, this controller 11 determines the ON/OFF state of the ignition switch 33, and when it is determined that the ignition switch 33 is in the OFF state, the controller 11 prevents learning of the step position of the stepping motor 24 from being executed even when the engine 1 rotates while reducing the rotational speed. This kind of function of the controller 11 will be explained with reference to the flowchart in FIG. 3. The operation illustrated in the flowchart is automatically and repeatedly performed (start→each step→end→start→ . . . ) while power is flowing to the controller 11 or while the voltage inside the controller 11 is maintained based on the existence of a capacitor or secondary battery. In other words, in addition to when learning control has not even been executed once (immediately after the ignition switch 33 has been turned ON), the operation illustrated in this flowchart is repeatedly performed during execution of learning control (state of adjusting the step position), and furthermore after learning control is completed (after learning of the step position that can stop the output shaft 14 has been performed once).

Figure 3:
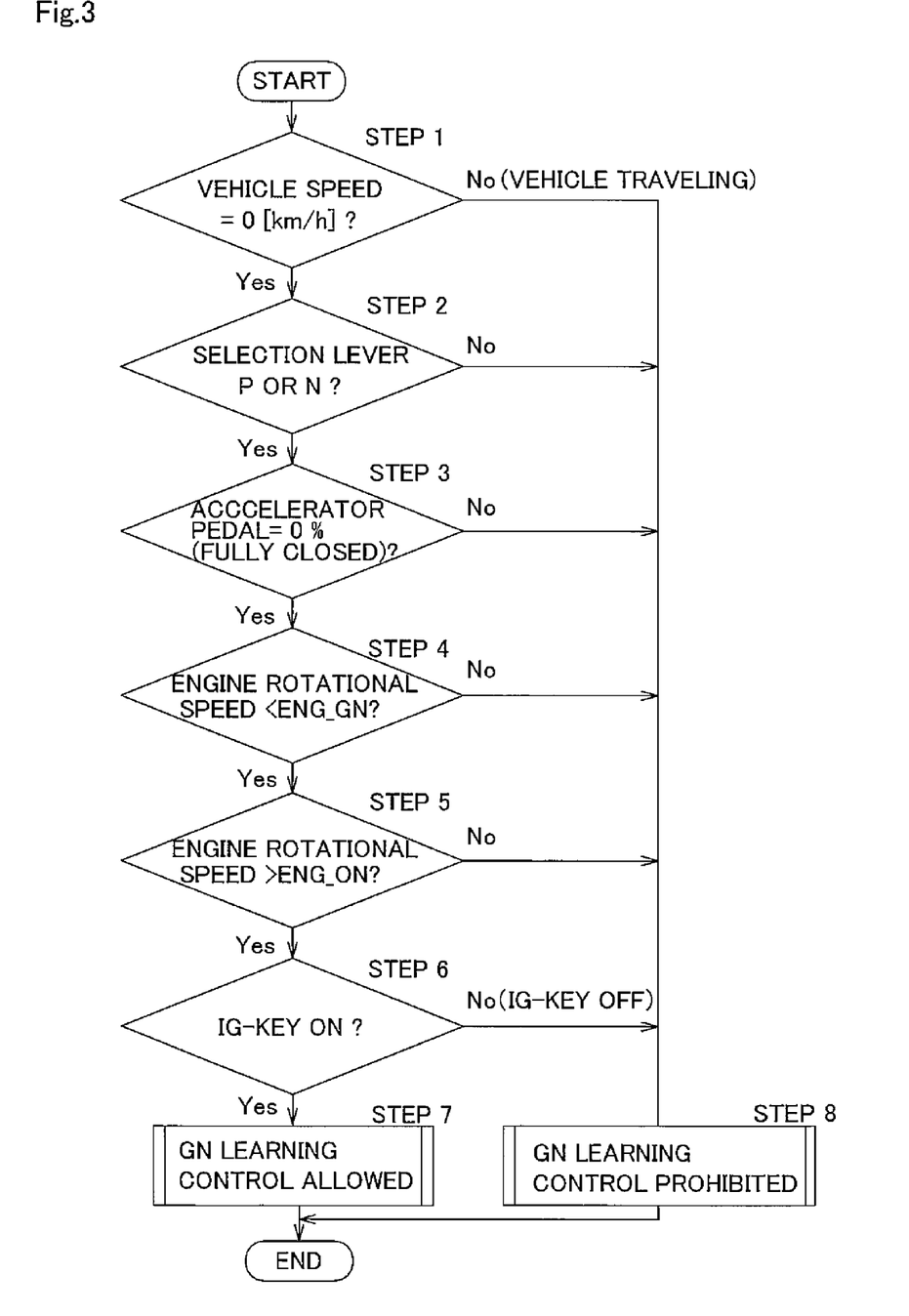
FIG. 3 is a flowchart illustrating the operation that is characteristic of the example of an embodiment of the present invention shown in FIG. 1.

First, the controller 11, in step 1, determines whether or not the traveling speed of the vehicle is "0". This determination is performed based on a signal from the output-shaft rotation sensor 17, or from a speed sensor (not illustrated in the figure). Processing advances to step 8 without advancing to the next step 2 except when the traveling speed of the vehicle is "0".

On the other hand, when the traveling speed of the vehicle is "0", the controller 11 next advances to step 2, and determines whether or not a non-moving state is selected. This determination is performed based on a signal from the position switch 30. When the operation position of the shift lever that is provided on the driver's side is in the P range or N range, it is determined based on the signal from the position switch 30 that a non-moving state is selected, otherwise it is determined that a non-moving state is not selected. The controller 11 advances to step 8 that will be described later without advancing to the next step 3 except when a non-moving state is selected.

On the other hand, when a non-moving state is selected, the controller 11 next advances to step 3, and determines whether or not the accelerator pedal is in the fully closed state. This determination is performed based on a signal from the accelerator sensor 31. When the accelerator pedal opening is 0%, it is determined that the accelerator pedal is fully closed, otherwise it is determined that the accelerator pedal is not fully closed. The controller 11 advances to step 8 that will be described later without advancing to the next step 4 except when the accelerator is fully closed. In this kind of step 3, the state when the accelerator opening is not 0% (when the accelerator pedal is pressed) can be eliminated from being an object of learning control for learning the step position. Therefore, in addition to the state in which the rotational speed of the engine 1 is fluctuating due to changing (increasing or decreasing) the amount that the accelerator pedal is pressed, the state in which the amount that the accelerator pedal is pressed is constant and the rotational speed of the engine 1 does not fluctuate (or is not likely to fluctuate) can also be eliminated from being an object of learning control of the step position. However, even though the accelerator opening is 0%, such as immediately after the accelerator pedal is released, the state in which the rotational speed of the engine 1 decreases is not (cannot be) eliminated from being an object of learning control.

In step 3, when the accelerator pedal is fully closed, the controller 11 advances to the next step 4, and determines whether or not the rotational speed of the engine 1 is lower than an upper limit rotational speed {ENG_GN=target idling speed (TRGET_IDLE)+X} that is set to a value that is higher than the target idling speed that is set by the controller 11. Here, the "target idling speed" is the engine rotational speed that is set by the controller 11 based on a map or the like depending on the coolant temperature, intake air temperature, rotating state of auxiliary machinery (for example, compressor for car air-conditioner) and the like, and, in case during warming-up operation, it is set to a value that is higher than during normal operation.

Moreover, the amount (value X) that the set upper limit rotational speed (ENG_GN) is greater than the target idling speed (TRGET_IDLE) can be appropriately set (tuning value) based on the engine characteristics (for example, type of engine) and the like. This tuning value X can be set corresponding to a rotational speed value that is a little higher than the target idling speed, through which the engine rotational speed passes during returning to the target idling speed and to which the engine rotational speed reaches within a relatively short time from the high rotation state immediately after the engine is started. More specifically, in the case of a typical normal automobile, the value X can be set to about 300 to 500 rpm. For example, when the value is set to X=400 rpm, the controller 11 determines whether or not the rotational speed of the engine 1 is lower than the rotational speed value of the target idling speed+400 rpm. This determination is performed based on a signal from the input-side rotation sensor 9 (in case that rotation of a crankshaft of the engine 1 is transmitted as is to the input shaft 3 and input-side disk 6), or based on a signal for displaying the engine rotational speed on a tachometer on the driver's side. Except when the rotational speed of the engine 1 is less than the rotational speed value of the target idling speed+400 rpm, the controller 11 advance to step 8 described later without advancing to the next step 5. In this kind of step 4, the state immediately after the accelerator pedal is released where the rotational speed of the engine 1 decreases even though the accelerator opening is 0% that could not be eliminated from being an object of learning control in step 3 is eliminated from being an object of learning control.

In step 5, the controller 11 determines whether or not the engine 1 rotational speed is higher than a set lower limit rotational speed (ENG_ON) that was set to a value lower than a target idling speed that is set by the controller 11. This set lower limit is a tuning value that can be appropriately set based on the engine characteristics (for example, type of engine), and for example, can be set to a rotational speed that is about 50% to 70% of the target idling speed. More specifically, in the case of a typical normal automobile, this set lower limit rotational speed can be set to a value of 400 to 600 rpm. When this set lower limit rotational speed is set to a value that is lower than 50% of the target idling speed, many of the unstable state of rotational speed in which the engine rotational speed is rising such as immediately after the ignition switch is turned ON become included as an object of learning control, so it becomes difficult to accurately calculate the transmission gear ratio of a toroidal continuously variable transmission, and thus the occurrence frequency of erroneous learning increases. On the other hand, when this set lower limit rotational speed is set to a value that is higher than 70% of the target idling speed, there is a possibility that the idling speed that fluctuates due to the temperature of coolant will become lower than the set lower limit rotational speed even though the engine rotational speed does not decreased in a state that the ignition switch is ON, and so there is a possibility that learning opportunities will be lost more than is necessary. Therefore, it is necessary to set this set lower limit rotational speed from the aspect of sufficiently maintaining the occurrence frequency of executing learning control, while the lower rotation range where the rotation state of the engine becomes unstable is eliminated from being an object of learning control.

In this example, the set lower limit rpm is set to 500 rpm, and it is determined whether or not the rotational speed of the engine 1 is higher than 500 rpm. This determination as well, as in the case in step 4, is performed based on the input-side rotation sensor 9 (when the rotation of a crankshaft of the engine 1 is transmitted as is to the input shaft 3 and input-side disk 6), or on a signal for displaying the engine rotational speed on a tachometer on the driver's side. As long as the rotational speed of the engine 1 is not higher than the set lower limit of 500 rpm, processing advances to step 8 described later without advancing to the next step 6. In this kind of step 5, the case when the rotational speed of the engine 1 is equal to or less than 500 rpm is simply eliminated from being an object of learning control for learning the step position. However, after the ignition switch 33 is turned OFF, the state is eliminated from being an object of learning control in step 6 described later, so in step 5, the state in which the ignition switch 33 is ON is eliminated from being an object of learning control when the rotational speed of the engine 1 is equal to or less than 500 rpm.

Figure 4:
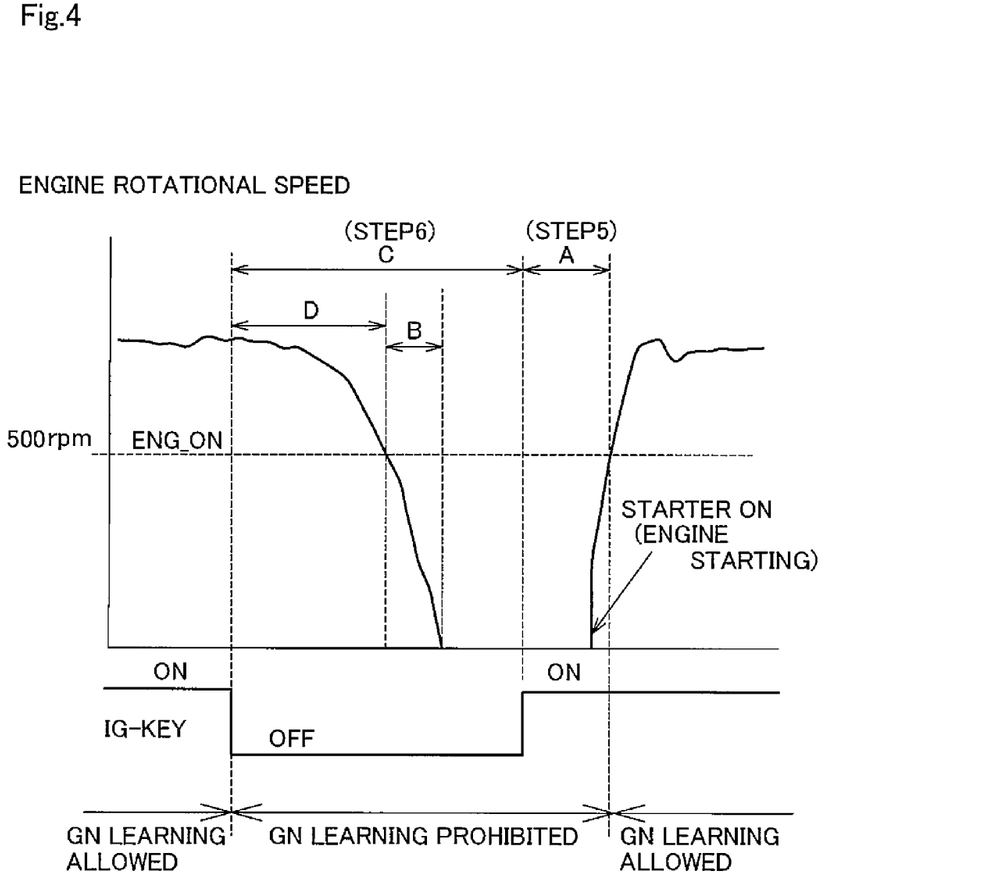
FIG. 4 is a drawing for explaining the learning state for learning a step position, and illustrates the relationship among the engine rotational speed, the ON/OFF state of the ignition switch, and the lower-limit rotational speed.

In other words, as can be clearly seen from FIG. 4 that illustrates the relationship between the engine rotational speed and the set lower limit rotational speed (ENG_ON), in step 5, from when the ignition switch 33 is turned ON and the starter begins to operate until the rotational speed of the engine 1 reaches 500 rpm (range A in FIG. 4) is eliminated from being an object of learning control for learning the step position. On the other hand, after a specified amount of time has elapsed after the ignition switch 33 has been turned OFF, and from when the rotational speed of the engine 1 becomes 500 rpm until it becomes "0" (range B in FIG. 4) can also be eliminated in step 5 from being an object of learning control, however, in step 6 described later, the state immediately after the ignition switch 33 is turned OFF, or in other words, the state just before the rotational speed drops to 500 rpm is eliminated from being an object of learning control, so does not need to be eliminated in step 5.

Next, in step 6, the controller 11 determines whether or not the ignition switch 33 is in the ON state. When the ignition switch 33 is in the ON state, processing advances to the next step 7. However, when the ignition switch 33 is in the OFF state, processing advances to step 8 described later without advancing to the next step 7. As can be clearly seen in FIG. 4 that illustrates the relationship between the engine rotational speed and the ON/OFF state of the ignition switch 33, in step 6, in which this kind of determination is performed, from immediately after the ignition switch 33 is turned OFF until the next time the ignition switch 33 is turned ON (range C in FIG. 4) is eliminated from being an object of learning control. The determination of the ON/OFF state of the ignition switch can be performed by directly inputting a signal from the ignition switch 33 to the controller 11 and having the controller 11 directly determine the state, or can be performed by using a signal from an engine controller.

In step 6, when it is determined that the ignition switch 33 is in the ON state, the controller 11 allows learning control of the step position for achieving a state of an infinitely large transmission gear ratio, and executes learning control. More specifically, by driving the stepping motor 24, the controller 11 adjusts the transmission gear ratio of the toroidal continuously variable transmission 4 within a range of ±α (threshold value) of the transmission gear ratio (geared neutral transmission gear ratio) where the rotational speed of the output shaft 14 is "0". This geared neutral transmission gear ratio is found by calculating the transmission gear ratios of the gears of the planetary gear transmission 12, and is, for example, approximately 1.306. Therefore, the controller 11 sets the threshold value to ±0.01, and adjusts the transmission gear ratio of the toroidal continuously variable transmission 4 to be within the range 1.306±0.01.

In the case of this example, the stepping motor 24 is not driven to a specified step position (set learned value), but rather the step position of the stepping motor 24 is a reference value of transmission gear ratio control where the transmission gear ratio of the toroidal continuously variable transmission 4 is within a range of 1.306±0.01. Therefore, while learning control is being executed, REAL_SMP that indicates the current step position of the stepping motor 24 is fixed at "0" that indicates the reference value (REAL_SMP=0), and the current step position (REAL_SMP) is handled as a reference value for obtaining the state of an infinitely large transmission gear ratio. Moreover, there is no position sensor or rotation angle sensor for measuring the stroke position of the output rod of the stepping motor 24.

The work of actually adjusting the transmission gear ratio of the toroidal continuously variable transmission 4 is performed by causing the output rod of the stepping motor 24 to displace while observing the detection signals from the input-side rotation sensor 9 and output-side rotation sensor 10 (rotational speed $N_{ID}$ of the input-side disk 6, rotational speed $N_{OD}$ of the output-side disk 8), or in other words, while observing the transmission gear ratio of the toroidal continuously variable transmission 4 that is calculated based on the second function of the controller 11. Then, in order to cause this output rod to displace, the number of steps of the stepping motor is counted in relation to the direction of driving the stepping motor 24. For example, when the stepping motor 24 is driven one step toward the Low side, the value (GN_SMP, initial value 0) that indicates the step position (number of steps) of the stepping motor 24 that is in the progress of being learned is counted up one step (GN_SMP=GN_SMP+1). On the other hand, when the stepping motor 24 is driven one step toward the High side, the value that indicates the step position of the stepping motor 24 that is in the progress of being learned is counted down one step (GN_SMP=GN_SMP−1).

The controller 11, together with determining whether or not the transmission gear ratio of the toroidal continuously variable transmission 4 is adjusted to be within the range 1.306±0.01, determines whether or not that transmission gear ratio falls into that range in a specified amount of time (for example, 3 seconds). When it is determined that the transmission gear ratio of the toroidal continuously variable transmission 4 is adjusted to within the range 1.306±0.01, and that it falls into that range within a specified amount of time, the controller 11 ends learning control and sets a learning complete flag that indicates that learning is completed (F_GN_LEARN=0→1). Moreover, the controller 11 learns the step position (GN_SMP) of the stepping motor 24 at the instant when the transmission gear ratio is adjusted to within the range above as the reference position at which the state of an infinitely large transmission gear ratio is obtained, and stores that step position in the memory of the controller 11 (GN_SMP=REAL_SMP=0). The controller 11 then advances to the end of the process, and returns to the start again.

On the other hand, in steps 1 to 6, which are provided with the conditions allowing learning such as described above, when, based on operation of the shift lever, accelerator pedal or ignition key by the operator, any one of the conditions is not satisfied, for example, when the ignition switch 33 is turned OFF, or when the shift lever is switched from the P range to the D range, processing advances to step 8 and learning control for learning the step position for achieving a state of an infinitely large transmission gear ratio is prevented, (discontinued). Then, a learning uncompleted flag that indicates that learning control has not finished is set (F_GN_LEARN=0), and then processing advances to the end and returns to the start.

With the continuously variable transmission device of this example that has construction such as described above, and that operates as described above, it is possible to ensure reliability of the learned value without losing learning opportunities more than necessary, even when the ignition switch 33 is turned OFF during learning of the step position of the stepping motor 24, which is the reference for controlling the transmission gear ratio of the toroidal continuously variable transmission 4.

In other words, in this example, in step 6, the state in which the rotational speed of the engine 1 is dropping from immediately after the ignition switch 33 is turned OFF to when the rotational speed becomes "0" (when the rotational speed is in an unstable state) can be eliminated from being an object of learning control for learning the step position. Therefore, it is possible to effectively prevent erroneous learning such as the obtained learned value becoming not suitable for stopping the output shaft 14. However, in this example, performing learning is prevented with the ignition switch 33 is turned OFF which causes the rotational speed of the engine 1 to drop, so the state in which the rotational speed of the engine 1 is stable such as during idling is not eliminated from being an object of learning control. Therefore, with this example, it is possible to ensure reliability of the learned value of the step position of the stepping motor 24 without losing learning opportunities more than necessary.

Furthermore, in this example, in step 5, the state from when the ignition switch 33 is turned ON and the stator begins to operate, until the rotational speed of the engine 1 rises and reaches the set lower limit rotational speed (500 rpm) (range A in FIG. 4) can be eliminated from being an object of learning control for learning the step position. As in the case when the engine rotational speed is decreasing, it is possible to eliminate the case when the rotational speed of the engine 1 is rising and there is a possibility that the amount of change (rise) in the rotational speed between the input-side disk 6 and the output-side disk 8 will not coincide from being an object of the learning control, so it is possible to further improve the reliability of the learned value for the step position.

INDUSTRIAL APPLICABILITY

The continuously variable transmission device of the present invention in which a toroidal continuously variable transmission is assembled not only can be applied for use in an automatic transmission of an automobile, but can also be widely applied for use in automatic transmissions of other kinds of vehicles, in automatic transmission of construction machinery, in automatic transmissions for generators that can be used in aircraft (fixed wing aircraft, rotary wing aircraft, blimps) and the like.

EXPLANATION OF REFERENCE NUMBERS

1 Engine
2 Damper
3 Input shaft
4 Toroidal continuously variable transmission
5 Pressure device
6 Input-side disk
7 Power roller
8 Output-side disk
9 Input-side rotation sensor
10 Output-side rotation sensor
11 Controller
12 Planetary gear transmission
13 Clutch device
14 Output shaft
15 Low-speed clutch
16 High-speed clutch
17 Output-shaft rotation sensor
18 Oil pump
19 Actuator
20 Control value device
21 Control valve
22a, 22b Hydraulic oil chamber
23, 23a to 23d Hydraulic sensor
24 Stepping motor
25 Loading pressure control opening/closing solenoid
26 Mode switching control opening/closing solenoid
27 Low-speed clutch solenoid
28 High-speed clutch solenoid
29 Oil temperature sensor
30 Position switch
31 Accelerator sensor
32 Brake switch
33 Ignition switch
34 Manual hydraulic switching valve
35 Oil reservoir
36a, 36b Regulator valve

What is claimed is:

1. A continuously variable transmission comprising:
    an input shaft;
    an output shaft;
    a toroidal continuously variable transmission;
    a differential gear unit; and
    a controller;
    the input shaft being a shaft to which engine output is inputted;
    the toroidal continuously variable transmission comprising
        an input-side disk that is rotated and driven by the input shaft;
        an output-side disk that is concentric with the input-side disk and that is supported so as to be able to rotate freely with respect to the input-side disk;
        a plurality of power rollers that is held between the input-side disk and the output-side disk;
        a plurality of support members that supports the power rollers so as to be able to roll freely;
        an actuator that changes a transmission gear ratio between the input-side disk and the output-side disk by causing the support members to be displaced;
        a control unit that has an adjustment member that controls a direction and amount of displacement of the actuator in order to adjust the transmission gear ratio to a desired value;
        an input-side rotation sensor for detecting a rotational speed of the input-side disk; and
        an output-side rotation sensor for detecting a rotational speed of the output-side disk,
    the differential gear unit comprising
        a first input section that has a plurality of gears and that is rotated and driven by the input shaft along with the input-side disk; and
        a second input section that is connected to the output-side disk, taking a rotation according to a speed difference between the first and second input sections, and transmitting the rotation to the output shaft,
    the controller being for controlling a change in the transmission gear ratio of the toroidal continuously variable transmission; and including
    a first function that, by adjusting the transmission gear ratio of the toroidal continuously variable transmission and changing a relative displacement speed of the plurality of gears, converts a rotational state of the output shaft to forward rotation or reverse rotation with a stopped state in between while the input shaft is being rotated as is in one direction;
    a second function of calculating the transmission gear ratio of the toroidal continuously variable transmission from the rotational speed of the input-side disk that is found from the input-side rotation sensor, and the rotational speed of the output-side disk that is found from the output-side rotation sensor; and
    a third function of performing learning control that, with satisfying specified conditions for allowing learning as a condition, adjusts the transmission gear ratio of the toroidal continuously variable transmission to a state where the rotational speed of the output shaft becomes "0", and then learns and stores a position of the adjustment member in this state as a position where the output shaft is stopped while the input shaft is rotating as is, wherein
    a state in which an ignition switch for starting and stopping an engine is ON, and an engine rotational speed being a higher value than a set lower-limit rotational speed, which was set to a value lower than a target idling speed that is set by the controller, so as to eliminate from when the ignition switch is ON until the engine rotational speed reaches the set lower-limit rotational value where a rotation state of the engine becomes stable from being an object of the learning control, are included in the conditions for allowing learning for executing the learning control by the third function and wherein
    performing the learning control is prevented with the ignition switch being turned OFF.

2. The continuously variable transmission device according to claim 1, wherein
    the set lower-limit rotational speed is set to a rotational speed that is about 50% to 70% of the target idling speed.

* * * * *